United States Patent Office 2,837,538
Patented June 3, 1958

2,837,538
17-THIOANDROSTADIENES

Raymond M. Dodson, Park Ridge, and Paul B. Sollman, Skokie, Ill., assignors to G. D. Searle & Co., Chicago, Ill., a corporation of Delaware No Drawing. Application April 19, 1956
Serial No. 579,135

9 Claims. (Cl. 260—397.3)

The present invention relates to a new class of thiosteroids, and is specifically concerned with those derivatives of 5,16-androstadien-3-ol and of 4,16-androstadien-3-one which are substituted at the 17-position by a substituent containing sulfur in a bivalent state, said substituent being attached to the carbon atom at position 17 by a carbon-sulfur valence bond. The compounds of this invention consequently include the 4,16-androstadiene derivatives of the structural formula

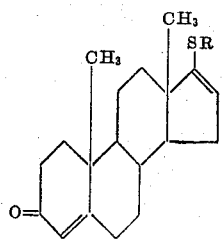

wherein R is a lower alkyl or a lower alkanoyl radical, and the 5,16-androstadiene derivatives of the structural formula

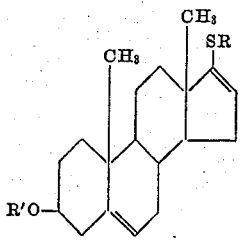

wherein R is defined as hereinbefore and R' is hydrogen or a lower alkanoyl radical.

Among the lower alkyl radicals which the term R can represent are methyl, ethyl, propyl, butyl, amyl, hexyl, heptyl, octyl and branched-chain isomers thereof. The expression "lower alkanoyl" is defined herein to mean an acyl radical of an alkanoic acid containing fewer than 9 carbon atoms. The lower alkanoyl radicals embraced in this definition consequently include formyl, acetyl, propionyl, butyryl, valeryl, hexanoyl, heptanoyl, octanoyl and branched-chain isomers thereof.

The compounds of this invention can be prepared from such starting materials as 3β-hydroxy-5-androstene-17-thione, described in our copending application, Serial No. 485,606, filed February 1, 1955, now U. S. Patent No. 2,753,361, and 3-oxo-4-androstene-17-thione, described in our copending application, Serial No. 491,507, filed March 1, 1955, now U. S. Patent No. 2,763,669. For convenience in visualizing the processes of the present invention, the products described and claimed herein can be regarded as derived from the enethiol forms of the thioketones named as starting materials. It will be appreciated, however, that while these enethiols are useful in the formulation of concepts of the described reactions, the free enethiols themselves are believed to be incapable of stable existence independent of the thioketones to which they are related.

Treatment of a steroidal 17-thioketone of the types named hereinbefore with an alkylating reagent such as a dialkyl sulfate in a basic medium, or a mixture comprising a lower alkanol, an alkali metal alkoxide and an alkyl halide results in the formation of an alkylation product which is structurally related to the enethiol form of the parent thioketone. Thus, 17-methylthio-5,16-androstadien-3β-ol is obtained by the treatment of 3β-hydroxy-5-androstene-17-thione in methanolic solution with sodium methoxide and methyl iodide.

Acyl derivatives are obtained by treatment of the parent thioketone with an acylating medium comprising a basic catalyst such as pyridine and a lower alkanoic acid anhydride, or a lower alkanoyl halide. Thus, treatment of 3-oxo-4-androstene-17-thione with a mixture of pyridine and acetic anhydride yields 17-acetylthio-4,16-androstadien-3-one, and treatment of 3β-hydroxy-5-androstene-17-thione with pyridine and acetic anhydride yields the diacetyl derivative, 3β-acetoxy-17-acetylthio-5,16-androstadiene.

Other alkylation and acylation products, homologously related to those described hereinbefore, are obtained by suitable selection of the alkylating or acylating reagent, as illustrated in the examples to follow.

A noteworthy feature of this invention is that the alkyl and alkanoyl derivatives related to the enethiol structure are formed with an ease which is totally unpredictable from a consideration of the chemical behavior of the oxygen analogs of the parent 17-thioketones. Thus, while formation of enolic derivatives of a steroidal 17-ketone proceeds under relatively drastic conditions or not at all, the enethiolic compounds of this invention are formed in high yields and in excellent states of purity under unexpectedly mild conditions.

The compounds of this invention have useful pharmacological actions, including hormonal and anti-hormonal properties not substantially analogous to those of their 16,17-dihydro derivatives. They are anti-inflammatory agents, as shown by their effectiveness in reducing inflammation of the iris. The compounds of this invention are also effective in decreasing the serum ratio of cholesterol to phospholipids, and they produce this change, useful in the treatment of hyperchloesterolemia and disorders associated therewith without producing the excessive estrogenic side-effects commonly associated with therapeutic agents which regulate cholesterol transport and metabolism.

The compounds of this invention are also useful as intermediates in organic syntheses. For example, by oxidation with a peroxy acid such as perbenzoic acid, they yield sulfoxides and sulfones. As a specific example, oxidation of 17-methylthio-4,16-androstadien-3-one with 2 molecular equivalents of perbenzoic acid yields 17-methylsulfonyl-4,16-androstadien-3-one. This compound has anti-infective and, in particular, anti-viral properties. When administered with cortisone, it inhibits the ability of cortisone to promote a Coxsackie virus infection.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (°C.) and quantities of materials in parts by weight.

Example 1

A solution prepared from 8 parts of 3β-hydroxy-5-androstene-17-thione, 240 parts of methanol, 1.5 parts of sodium methoxide and 3.8 parts of methyl iodide is allowed to stand for 3 hours at room temperature. The product obtained by diluting the mixture with water is collected on a filter. By recrystallization from aqueous methanol there is obtained 17-methylthio-5,16-androstadien-3β-ol melting at about 165–166° C. This compound has the structural formula

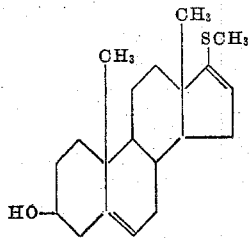

By the same procedure, with the substitution of 240 parts of ethanol for the methanol, 1.9 parts of sodium ethoxide for the sodium methoxide, and 4.2 parts of ethyl iodide for the methyl iodide, there is obtained 17-ethylthio-5,16-androstadien-3β-ol.

*Example 2*

A solution of 2 parts of 3β-hydroxy-5-androstene-17-thione, 80 parts of butanol, 0.67 part of sodium butoxide and 1.23 parts of 1-iodobutane is allowed to stand at room temperature for 16 hours. It is then concentrated under reduced pressure, suitably at a temperature of less than 50° C., to about 1/10 of its original volume, and diluted with about 150 parts of water. The insoluble product is collected, washed and recrystallized from methanol or aqueous methanol, whereby there is obtained 17-butylthio-5,16-androstadien-3β-ol of the structural formula

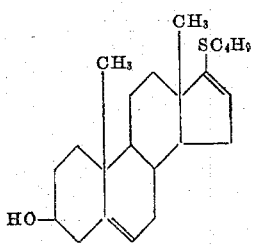

*Example 3*

A solution is prepared from 9 parts of 3β-hydroxy-5-androstene-17-thione, 80 parts of methanol, 1.6 parts of sodium methoxide and 6.2 parts of 1-iodopropane. An insoluble reaction product soon appears, and when its separation is complete, it is collected on a filter and washed. This compound is 17-propylthio-5,16-androstadien-3β-ol which melts at about 135–138° C. and has the structural formula

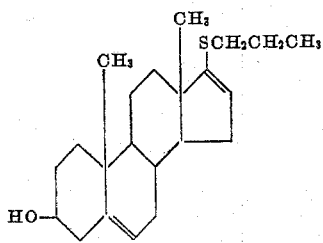

*Example 4*

A mixture of 1 part of 17-methylthio-5,16-androstadien-3β-ol, 10 parts of pyridine and 2.5 parts of butyric anhydride is allowed to stand for 18 hours at about 25° C. The reaction mixture is diluted with several times its volume of water, and when separation of the insoluble reaction product is complete, it is collected and washed. This compound is 3β-butyroxy-17-methylthio-5,16-androstadiene (17-methylthio-5,16-androstadien-3β-ol butyrate).

*Example 5*

A solution of 65 parts of 3β-hydroxy-5-androstene-17-thione, 500 parts of pyridine and 540 parts of acetic anhydride is allowed to stand for 18 hours at about 25° C. The reaction mixture is poured into several times its volume of ice water and allowed to stand until separation of the insoluble product is complete. This crude product is collected on a filter, washed with water and dried. Purification by repeated crystallizations from petroleum ether yields the diacetyl derivative, 3β-acetoxy-17-acetylthio-5,16-androstadiene melting at about 139–141° C. This compound has the structural formula

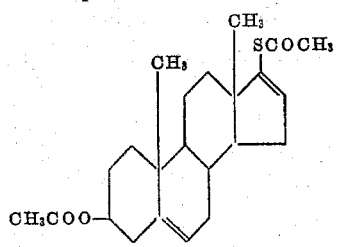

*Example 6*

A solution of 1 part of 3β-hydroxy-5-androstene-17-thione, 10 parts of pyridine and 5 parts of propionic anhydride is allowed to stand for 24 hours at about 25° C. The reaction mixture is diluted with several times its volume of ice water, and the insoluble product is collected and washed with water. This compound is the dipropionyl derivative, 3β-propionoxy-17-propionylthio-5,16-androstadiene.

*Example 7*

A solution of aluminum isopropoxide is prepared by stirring 12 parts of this compound with 45 parts of toluene, and by decanting from the small amount of insoluble residue. This solution of aluminum isopropoxide is mixed with 11.1 parts of 17-methylthio-5,16-androstadien-3β-ol, 76 parts of cyclohexanone and 440 parts of toluene, and this reaction mixture is heated under reflux for 30 minutes. There is then added a solution of 50 parts of sodium potassium tartrate in 200 parts of water, and the resulting mixture is distilled with steam until the organic solvents are removed. The aqueous suspension which remains is chilled and filtered in order to collect the insoluble organic product. Purification by repeated crystallizations from ethyl acetate or by sublimation under reduced pressure followed by recrystallization of the sublimate from ethyl acetate yields 17-methylthio-4,16-androstadien-3-one melting at about 188–190° C. This compound has the structural formula

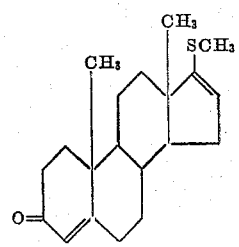

The same compound is obtained by alkylation of 3-oxo-4-androstene-17-thione with methyl iodide by the procedure of Example 1.

*Example 8*

A solution of aluminum isopropoxide is prepared by stirring 6 parts of this compound with 25 parts of toluene, and by decanting from the small amount of insoluble residue. A reaction mixture prepared from this solution of aluminum isopropoxide, 6 parts of 17-butylthio-5,16-androstadien-3β-ol, 40 parts of cyclohexanone and 260 parts of toluene is heated under reflux for 30 minutes. There is then added a solution of 30 parts of sodium potassium tartrate in 125 parts of water, and the resulting mixture is distilled with steam until the organic solvents are removed. After the remaining aqueous suspension is chilled, the insoluble organic product is collected and washed. Purification by repeated crystallizations from ethyl acetate yields 17-butylthio-4,16-androstadien-3-one of the structural formula

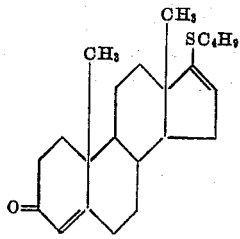

*Example 9*

A solution of 8 parts of 3-oxo-4-androstene-17-thione, 50 parts of pyridine and 50 parts of acetic anhydride is allowed to stand for 16 hours at about 25° C. after which it is poured into several times its volume of ice water in order to hydrolyze unreacted acetic anhydride and precipitate the reaction product. When separation of the reaction product is complete, it is collected and subjected to a preliminary purification by reprecipitating it from methanol solution by the addition of water. By crystallization of the reprecipitated product from petroether and then from aqueous methanol, there is obtained 17-acetylthio-4,16-androstadien-3-one which melts at about 114–115° C. and has the structural formula.

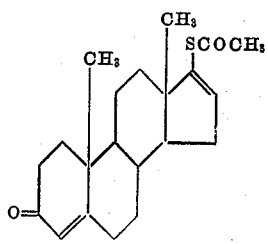

By the substitution of 30 parts of butyric anhydride for the acetic anhydride in the foregoing procedure, there is obtained 17-butyrylthio-4,16-androstadien-3-one.

*Example 10*

To a solution of 9.5 parts of 17-methylthio-4,16-androstadien-3-one in 660 parts of benzene there is added, with stirring, a 0.13 molar solution of perbenzoic acid in benzene containing a total of 8.3 parts of perbenzoic acid. About 30 minutes after all of the perbenzoic acid solution has been added, the mixture is washed with dilute sodium hydroxide solution and with several portions of water, and the organic solution is concentrated to dryness under reduced pressure. Purification by successive crystallizations of the residue from aqueous methanol and from a mixture of ethyl acetate and petroleum ether yields 17-methylsulfonyl-4,16-androstadien-3-one melting at about 157° C. This compound has the structural formula

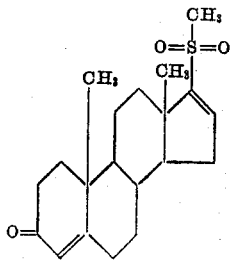

What is claimed is:
1. A member of the group consisting of compounds of the structural formula

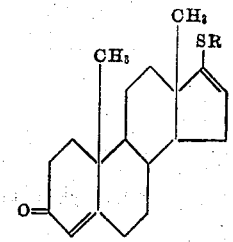

and compounds of the structural formula

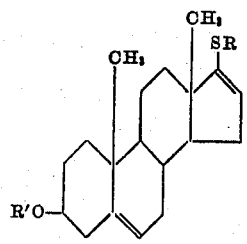

wherein R is a member of the group consisting of lower alkyl and lower alkanoyl radicals and R' is a member of the group consisting of hydrogen and lower alkanoyl radicals.

2. A compound of the structural formula

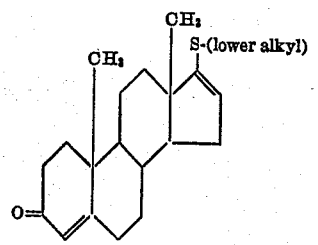

3. 17-methylthio-4,16-androstadien-3-one.
4. A compound of the structural formula

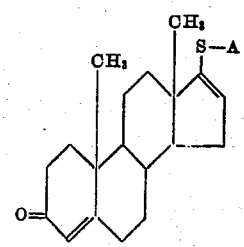

wherein A is a lower alkanoyl radical.
5. 17-acetylthio-4,16-androstadien-3-one.
6. A compound of the structural formula

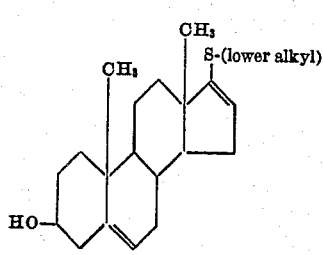

7. 17-methylthio-5,16-androstadien-3β-ol.

8. A compound of the structural formula
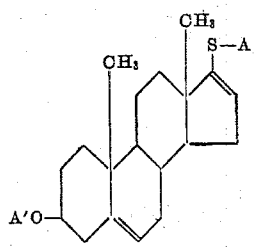
wherein A and A' are lower alkanoyl radicals.
9. 3-acetoxy-17-acetylthio-5,16-androstadiene.
References Cited in the file of this patent
UNITED STATES PATENTS
| | | |
|---|---|---|
| 2,550,702 | Levin | May 1, 1951 |
| 2,598,653 | Wettstein | May 27, 1952 |
| 2,598,654 | Wettstein | May 27, 1952 |
| 2,609,378 | Rosenkranz | Sept. 2, 1952 |
| 2,697,108 | Rosenkranz | Dec. 14, 1954 |
| 2,753,361 | Dodson et al. | July 3, 1956 |
| 2,763,669 | Dodson et al. | Sept. 18, 1956 |

UNITED STATES PATENT OFFICE

CERTIFICATE OF CORRECTION

Patent No. 2,837,538                                    June 3, 1958

Raymond M. Dodson et al.

It is hereby certified that error appears in the printed specification of the above numbered patent requiring correction and that the said Letters Patent should read as corrected below.

Column 5, line 31, for "petro-" read -- petroleum --.

Signed and sealed this 21st day of October 1958.

(SEAL)
Attest:

KARL H. AXLINE
Attesting Officer

ROBERT C. WATSON
Commissioner of Patents